United States Patent Office 2,994,688
Patented Aug. 1, 1961

2,994,688
PROCESS FOR CURING SULFOCHLORINATED HYDROCARBON POLYMERS
Kenneth Francis King, Wilmington, Del., assignor to E. I. du Pont de Nemours and Company, Wilmington, Del., a corporation of Delaware
No Drawing. Filed June 10, 1959, Ser. No. 819,242
1 Claim. (Cl. 260—79)

This invention is directed to a new process for preparing exceptionally heat resistant MgO vulcanizates of sulfochlorinated hydrocarbon polymers. These polymers can be used to make mechanical goods of many types, such as hose, belting, rolls, packing, tape, and the like, shoe soles and heels, protective coatings for rubber goods, white sidewalls for tires, weather stripping, pads, rollers, and jacketing for wire and cable; conventional methods of producing these goods may be followed.

It is known that sulfochlorinated hydrocarbon polymers can be cured by heating them with polyvalent metal hydroxide and oxides such as lead monoxide (litharge) and magnesium oxide (magnesia). However, the procedures available in the art have not been entirely satisfactory. Although stocks cured with litharge display excellent heat resistance, they tend to discolor; litharge, moreover, is a toxic compound. Magnesia is non-toxic and the vulcanizates cured with it do not discolor; however, it has been necessary to use a very high magnesia concentration to obtain vulcanizates with acceptable stress-strain properties. Unfortunately, such stocks tend to be scorchy and their vulcanizates, particularly when highly loaded with inorganic fillers, need improved heat resistance; economically, too, they are less attractive because magnesia is far more expensive than litharge.

It is, therefore, an object of the present invention to provide an improved process for curing sulfochlorinated polymers. It is a further object to provide a process with improved processing safety for curing sulfochlorinated polymers. It is a still further object of this invention to provide a process for curing sulfochlorinated hydrocarbon polymers to vulcanizates displaying good heat resistance. It is a yet still further object to provide a superior process for curing sulfochlorinated polyhydrocarbon elastomers with MgO.

More specifically, the present invention is directed to a process for curing a sulfochlorinated polymer containing 5–48% chlorine and 0.25–3% sulfur by weight which comprises compounding 100 parts by weight of said polymer with (1) about 1–2 parts of MgO, (2) about 1–6 parts of pentaerythritol, and (3) about 1–2 parts of a thiuram selected from the group consisting of dipentamethylene thiuram tetrasulfide, a tetra $C_1$–$C_2$ alkyl thiuram disulfide, and mixtures thereof, followed by heating said compounded polymer at 60–180° C. to effect a cure.

The sulfochlorinated polymers which are cured by the process of this invention are prepared by reacting saturated hydrocarbon (or chlorosubstituted hydrocarbon) polymers with a mixture of chlorine and sulfur dioxide (see U.S. Patent 2,212,786 of McQueen). Some of the hydrogen atoms on the original polymer are replaced by chlorine and by sulfonyl chloride, (—$SO_2Cl$), groups, their relative proportions depending on the ratio of chlorine and sulfur dioxide employed.

The useful sulfochlorinated polymers contain about 5 to 58% chlorine by weight and about 0.25 to 3% sulfur by weight, about 30–35% chlorine and about 0.9 to 1.5% sulfur being the preferred concentration ranges. The polymers having less than 5% chlorine are not elastomeric; the polymers having more than about 48% chlorine are somewhat stiff and rather difficult to process. Polymers containing less than about 0.25% sulfur are difficult to cure. On the other hand, when the sulfur content is increased much above 3%, the curing occurs so rapidly that scorching is a problem.

In operating the present invention a wide variety of sulfochlorinated polymers can be used. Representative examples include: sulfochlorinated polymers containing 25–37% chlorine and 0.4–3% sulfur made from polyethylene ethylene/vinyl chloride interpolymers, and ethylene/vinylidene chloride interpolymers (U.S. Patent 2,586,363 to McAlevy); sulfochlorinated polymers containing 20–45% chlorine and 0.25–3% sulfur made from hydrogenated homopolymers of conjugated hydrocarbon dienes, hydrogenated interpolymers of at least two conjugated hydrocarbon dienes, hydrogenated interpolymers of conjugated hydrocarbon dienes and chloroprene, and, hydrogenated interpolymers of hydrocarbon dienes and hydrocarbon (and chlorohydrocarbon) monoolefins (U.S. Patent 2,646,422 of Strain); sulfochlorinated interpolymers of at least two $C_2$–$C_6$ alpha olefins, containing 5–35% chlorine and 0.5–3% sulfur (U.S. Patent 2,879,261 of Johnson and Smook); sulfochlorinated polyethylene having a chlorine content of from 38–48% and a sulfur content of 0.7–3%, the polyethylene prior to sulfochlorination having a density of from 0.935 to about 0.960, a melt index of from 2 to about 200, a ratio of weight average to number average molecular weight between 2 and 10 and a solubility in $CCl_4$ of at least 1% by weight. Hydrogenated natural rubber and polyisobutylene can also be sulfochlorinated for use in this invention.

The curable sulfochlorinated polymer is compounded on a rubber roll mill (or by other techniques familiar to those skilled in the art) with about 1 to 2 parts by weight of MgO, 1 to 6 parts by weight of pentaerythritol, and about 1 to 2 parts by weight of a selected thiuram accelerator.

When less than 1 part of MgO is used per 100 parts of polymer, the vulcanizate tends to be undercured. When more than 2 parts of MgO is supplied, the compounded stocks tend to be more scorchy; furthermore, their vulcanizates exhibit decreased heat stability.

The vulcanizates are undercured when less than about 1 part of pentaerythritol is supplied. On the other hand, very little advantage is gained using more than about 6 parts. About 2 to 3 parts is preferred when the sulfochlorinated polymer contains about 0.9 to 1.5% sulfur by weight.

In order to attain a completely satisfactory cure, it is necessary that an accelerator be present. Dipentamethylenethiuram tetrasulfide is preferred. Alternatively, tetramethylthiuram disulfide or tetraethylthiuram disulfide or mixtures thereof can be substituted for part or all of the dipentamethylene thiuram tetrasulfide; they provide less processing safety, however. About 1 to 4 parts of the thiuram is used, about 2 to 2.5 parts being preferred when the sulfochlorinated polymer contains about 0.9 to 1.5% sulfur by weight.

Conventional fillers may be introduced, if desired. Representative compositions contain (based on 100 parts elastomer by weight): 26–52 parts of semi-reinforcing carbon black; 50–63 parts of titanium dioxide; 35–60 parts of titanium dioxide and 20–60 parts of calcium carbonate (whiting) in combination. A particularly valuable embodiment of the present invention is the processing of stock containing 50 parts each of whiting and titanium dioxide.

Representative examples illustrating the present invention are as follows.

The vulcanizate properties in the examples which follow were measured in accordance with the following ASTM procedures:

Stress-strain _____ D412–51T.
Permanent set _____ D412–51T.
Compression set _____ D395–55, method B.
Yerzley resilience _____ D945–55.

The Mooney scorch values were determined in accordance with ASTM procedure D1077–55T.

The 180° bend test: a sheet of elastomer died in the shape of a dumbbell (ASTM D412–51T) is folded flat across the narrow center; if the elastomer is satisfactory, no crack develops at the fold when the dumbbell is unfolded.

EXAMPLE 1

On a rubber roll mill six stocks (1A–1F) are compounded according to the following recipe:

Sulfochlorinated polyethylene (containing about 30% Cl, 1.5% S) _____ 100 parts.
Semi-reinforcing black _____ 26 parts.
Dipentamethylene thiuram tetrasulfide __ 1.5 parts.
2,2'-dithiobisbenzothiazole _____ 0.5 part.
MgO _____ (See Table I).
Pentaerythritol _____ (See Table I).

They are then cured in a press at 152.8° C. (307° F.) for 30 minutes. Table I which follows gives the properties of the vulcanizates obtained.

Table I

| Stock | 1-A | 1-B | 1-C | 1-D | 1-E | 1-F |
|---|---|---|---|---|---|---|
| MgO | 2 | 2 | 5 | 5 | 10 | 10 |
| PER [1] | 0 | 3 | 0 | 3 | | 3 |
| Mooney Scorch (min. to 20 pt. rise) (at 125.6° C.) | >45 | >45 | >45 | >45 | >45 | 26 |
| $M_{100}$ (p.s.i.) | 265 | 670 | 270 | 620 | 380 | 700 |
| $T_B$ (p.s.i.) | 1,090 | 2,410 | 1,565 | 2,700 | 1,810 | 2,620 |
| $E_B$ (Percent) | 470 | 240 | 450 | 250 | 350 | 210 |
| Permanent Set (Percent) | 15 | 0 | 13 | 4 | 20 | 3 |
| Compression Set (Percent) (at 70° C.) | 88 | 67 | 92 | 67 | 85 | 60 |
| Yerzley Resilience (Percent) | 47 | 56 | 49 | 56 | 47 | 56 |

[1] Pentaerythritol.

EXAMPLE 2

The procedure of Example 1 is repeated except that 63 parts of titanium dioxide is substituted for the 26 parts of semi-reinforcing black. Table II which follows gives the properties of the vulcanizates obtained.

Table II

| Stock | 2-A | 2-B | 2-C | 2-D | 2-E | 2-F |
|---|---|---|---|---|---|---|
| MgO | 2 | 2 | 5 | 5 | 10 | 10 |
| PER [1] | 0 | 3 | 0 | 3 | 0 | 3 |
| Mooney Scorch (min. to 20 pt. rise) (at 121.1° C.) | 3 x 6 slab Blown.[2] | >45 | >45 | 40 | 40 | 19 |
| $M_{100}$ (p.s.i.) | | 390 | 185 | 515 | 260 | 900 |
| $T_B$ (p.s.i.) | | 1,915 | 1,130 | 2,110 | 1,290 | 2,145 |
| $E_B$ (Percent) | | 320 | 590 | 320 | 505 | 260 |
| Permanent Set (Percent) | | 8 | 22 | 9 | 20 | 9 |
| Compression Set (Percent) (at 70° C.) | | 57 | 87 | 55 | 82 | 50 |
| Yerzley Resilience (Percent) | | 59 | 49 | 58 | 49 | 56 |

[1] Pentaerythritol.
[2] Too poor to test.

EXAMPLE 3

The procedure of Example 1 is repeated except that 50 parts of titanium dioxide and 50 parts of calcium carbonate are substituted for the 26 parts of semi-reinforcing black. Table III which follows gives the properties of the vulcanizates obtained.

Table III

| Stock | 3-A | 3-B | 3-C | 3-D | 3-E | 3-F |
|---|---|---|---|---|---|---|
| MgO | 2 | 2 | 5 | 5 | 10 | 10 |
| PER [1] | 0 | 3 | 0 | 3 | 0 | 3 |
| Mooney Scorch (min. to 20 pt. rise) (at 121.1° C.) | 45 | 37 | 17 | 25 | 9 | 11 |
| $M_{100}$ (p.s.i.) | 515 | 1,035 | 810 | 1,655 | 960 | 1,970 |
| $T_B$ (p.s.i.) | 1,600 | 2,080 | 1,945 | 2,630 | 2,180 | 2,740 |
| $E_B$ (Percent) | 390 | 250 | 300 | 200 | 240 | 190 |
| Permanent Set (Percent) | 15 | 6 | 7 | 5 | 5 | 5 |
| Compression Set (Percent) (at 70° C.) | 62 | 46 | 58 | 43 | 45 | 39 |
| Yerzley Resilience (Percent) | 48 | 61 | 49 | 58 | 49 | 57 |

[1] Pentaerythritol.

EXAMPLE 4

On a rubber roll mill two stocks (4A and 4B) are compounded according to the following formula:

Sulfochlorinated polyethylene (containing about 30% Cl, 1.5% S) _____ 100 parts.
Titanium dioxide _____ 50 parts.
Calcium carbonate _____ 50 parts.
Dipentamethylene thiuram tetrasulfide _ 2.0 parts.
MgO _____ (See Table IV).
Pentaerythritol _____ (See Table IV).

They are then cured in a press at 152.8° C. (307° F.) for 30 minutes. Table IV which follows gives the properties of the vulcanizates obtained.

Table IV

| Stock | 4-A | 4-B |
|---|---|---|
| MgO | 10 | 2 |
| Pentaerythritol | 0 | 3 |
| Mooney Scorch (min. to 20 pt. rise) (at 121.1° C.) | 16 | 32 |
| $M_{100}$ (p.s.i.) | 1,135 | 1,075 |
| $T_B$ (p.s.i.) | 2,410 | 2,125 |
| $E_B$ (Percent) | 200 | 300 |
| Permanent Set (Percent) | 0 | 10 |
| Compression Set (Percent) (at 70° C.) | 42 | 39 |
| Yerzley Resilience (Percent) | 53 | 62 |

EXAMPLE 5

On a rubber roll mill two stocks (5A–5F) are compounded according to the following recipe:

Sulfochlorinated polyethylene (containing about 34.5% Cl, 0.9% S) _____ 100 parts.
Titanium dioxide _____ 50 parts.
Calcium carbonate _____ 50 parts.
Dipentamethylene thiuram tetrasulfide _ 2 parts.
MgO _____ (See Table V).
Pentaerythritol _____ (See Table V).

They are then cured in a press at 152.8° C. (307° F.) for 30 minutes. The properties of the vulcanizates obtained are given in Table V.

Table V

| Stock | 5-A | 5-B |
|---|---|---|
| MgO | 10 | 2 |
| Pentaerythritol | 0 | 3 |
| Heat Resistance, 180° Bend Test (After Air Oven Aging): Time to Failure, 148.9° C. (Days) | 2 | 4 |

EXAMPLE 6

On a rubber roll mill two stocks (6A–6B) are compounded according to the following recipe:

Sulfochlorinated polyethylene (containing about 30% Cl, 1.5% S) _____ 100 parts.
Pentaerythritol _____ 63 parts.
Titanium dioxide _____ 2 parts.
MgO _____ 3 parts.
Tetramethyl thiuram disulfide _____ (See Table VI).
Tetraethyl thiuram disulfide _____ (See Table VI).

They are then cured in a press at 152.8° C. (307° F.) for 30 minutes. Table VI gives the properties of the vulcanizates obtained.

*Table VI*

| Stock | 6-A | 6-B |
|---|---|---|
| Tetramethyl thiuram disulfide | 2.5 | 0 |
| Tetraethyl thiuram disulfide | 0 | 2 |
| Mooney Scorch: | | |
| (min. to 10 pt. rise) (at 125.6° C.) | >45 | 28 |
| (min. to 20 pt. rise) | >45 | 34 |
| $M_{100}$ (p.s.i.) | 410 | 310 |
| $T_B$ (p.s.i.) | 1,765 | 1,920 |
| $E_B$ (Percent) | 400 | 500 |
| Compression Set (Percent) (at 70° C.) | 50 | 70 |
| Yerzley Resilience (Percent) | 62 | 57 |

EXAMPLE 7

Four stocks (7A–7D) are compounded on a rubber roll mill in accordance with following formulation:

| | Stocks—All Parts by Weight | | | |
|---|---|---|---|---|
| | 7-A | 7-B | 7-C | 7-D |
| Sulfochlorinated polyethylene (containing 30% Cl, 1.5% S) | 100 | 100 | 100 | 100 |
| Dipentamethylene thiuram tetrasulfide | 2 | 1.5 | 2 | 1.5 |
| 2,2-dithiobisbenzothiazole | 0 | 0.5 | 0 | 0.5 |
| MgO | 10 | 10 | 2 | 2 |
| Pentaerythritol | 0 | 0 | 3 | 3 |

The stocks obtained were cured as slabs in a press at 152.8° C. (307° F.) for 30 minutes. The vulcanizates were cut into dumbbells (ASTM D412–51T) which were placed in a circulating air oven where they were heat aged at 185° C. After 12 hours, the vulcanizates made from stocks 7–C and 7–D could be repeatedly bent without damage; however, the vulcanizates made from stocks 7–A and 7–B were severely degraded and split when bent.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows:

A process for curing a sulfochlorinated hydrocarbon polymer containing 5–48% chlorine and 0.25–3% sulfur by weight of said polymer, said process comprising compounding 100 parts by weight of said polymer with (1) about 1–2 parts of MgO, (2) about 1–6 parts of pentaerythritol, and (3) about 1–4 parts of a thiuram selected from the group consisting of dipentamethylene thiuram tetrasulfide, a tetra $C_1$–$C_2$ alkyl thiuram disulfide, and mixtures thereof, followed by heating said compounded polymer at 60–180° C. until cured.

References Cited in the file of this patent

UNITED STATES PATENTS

| 2,646,422 | Strain | July 21, 1953 |
| 2,683,103 | Smook et al. | July 6, 1954 |

UNITED STATES PATENT OFFICE
CERTIFICATE OF CORRECTION

Patent No. 2,994,688                          August 1, 1961

Kenneth Francis King

It is hereby certified that error appears in the above numbered patent requiring correction and that the said Letters Patent should read as corrected below.

Column 1, line 66, for "58%" read -- 48% --; column 4, line 71, for "63" read -- 3 --; line 72, for "2" read -- 63 --; line 73, for "3" read -- 2 --.

Signed and sealed this 19th day of December 1961

(SEAL)
Attest:

ERNEST W. SWIDER
Attesting Officer

DAVID L. LADD
Commissioner of Patents

USCOMM-DC